United States Patent [19]

Richter

[11] 4,386,108

[45] May 31, 1983

[54] COATED COCONUT, METHOD OF PREPARATION AND ICING THEREFROM

[75] Inventor: Gary W. Richter, Minneapolis, Minn.

[73] Assignee: General Mills, Inc., Minneapolis, Minn.

[21] Appl. No.: 340,440

[22] Filed: Jan. 18, 1982

[51] Int. Cl.$^3$ .......................... A23G 3/00; A23L 1/36
[52] U.S. Cl. .......................................... 426/93; 426/96; 426/102; 426/617; 426/572; 426/575; 426/579
[58] Field of Search .............. 426/617, 659, 572, 575, 426/93, 96, 103

[56] References Cited

U.S. PATENT DOCUMENTS

| | | | |
|---|---|---|---|
| 2,917,745 | 12/1959 | Kelley et al. | 426/617 |
| 3,655,409 | 4/1972 | Glasser et al. | 426/617 |
| 3,860,731 | 1/1975 | Forkner | 426/617 |
| 3,976,794 | 8/1976 | Johnson et al. | 426/617 |
| 4,343,820 | 8/1982 | Roseman | 426/617 |

OTHER PUBLICATIONS

"Application and Control of the Algin-Calcium Reaction", T. R. Andrew and W. C. MacLeod, Food Product Development, Aug.-Sep., 1970.

*Primary Examiner*—Jeanette M. Hunter
*Attorney, Agent, or Firm*—Gene O. Enockson; John A. O'Toole

[57] ABSTRACT

Disclosed are improved coconut pieces coated with an impermeable coating of insoluble calcium alginate as well as methods of preparing such coconut pieces. Such coated coconut pieces are especially suitable for incorporation into ready-to-spread frostings. The methods essentially comprise the steps, in sequence, of: (a) providing dehydrated coconut pieces having a moisture content of about 3.0% to 3.5% by weight; (b) applying a dilute aqueous solution of a water soluble source of calcium ions sufficient to provide up to about 0.2% by weight calcium based on the dry weight of the coconut to form calcium-laden coconut pieces; (c) drying to a moisture content of between about 12% to 16% by weight; (d) applying an aqueous solution of up to about 3% by weight low viscosity sodium alginate in amounts sufficient to provide up to about 0.90% alginate based on the dry weight of coconut pieces to form alginate encased coconut pieces; and (e) drying the pieces to a final moisture content of less than about 14% by weight. The coated pieces when incorporated into colored frosting exhibit minimal colorant and/or moisture migration.

6 Claims, No Drawings

COATED COCONUT, METHOD OF PREPARATION AND ICING THEREFROM

BACKGROUND OF THE INVENTION

1. Field of the Invention

The present invention relates to improved coconut products and to their method of preparation.

2. The Prior Art

The moisture content of fresh coconut meat averages about 50%. Conventionally, coconut meats are dried, and often, specifically, desiccated in the country of origin. Drying not only provides storage benefits but also reductions in transportation expenses.

Dried coconut in various shapes, e.g., shreds, flakes, often sugar impregnated, are widely used in foods, particularly in desserts and candies, e.g., cakes, frostings and the like. The present invention relates to coconut products and to their method of preparation that are suitable for use as an ingredient in ready-to-spread frostings.

Coconut flakes or pieces are often added to frostings prepared from scratch. Certain problems arise, however, when coconut is added to conventional ready-to-spread frostings. Frequently, such frosting compositions contain water soluble colorants suitable for the flavor of the frosting, e.g., red for strawberry, yellow for lemon flavored, etc. When freshly prepared, the typically pure white coconut desirably provides an easily discernible contrast to the background of the colored frosting base. Upon storage, however, migration of the color material into the coconut piece can occur. The coconut loses its pure white, "fresh" appearance. The coconut is then undesirably less readily perceived since it has absorbed some of the color of the background or even becomes the same hue as the frosting base.

Unprotected coconut pieces can also experience moisture migration. The moisture content of the frosting base, typically about 18–20%, is higher than the partially rehydrated coconut pieces, typically about 14%. The water activity of the coconut is lower than that of the frosting. Upon extended storage, the texture of the coconut ingredient is adversely affected due to water migration.

Coatings could be applied to conventional coconuts which are impermeable to either water or water soluble coloring agents. Such coatings are not made without certain difficulties. The coatings must be continuous, stable, easy to apply or otherwise process, and not interfere with either the flavor or the texture of the coconut. Numerous coating or film forming agents suffer from one or more of these deficiencies. Fat coated coconut pieces, for example, are difficult to process without clogging machinery. Starch coatings readily come off the coconut pieces resulting in discontinuous coatings. Cellulosic coatings cause undesirable off flavors.

It has been surprisingly discovered that the above problems can be overcome and superior coconut products provided by preparing coconut pieces having a coating of calcium set alginate sols. The coating provides a barrier to the migration of both moisture and water soluble coloring agents. The present invention also provides for methods for preparing such coated coconut products.

SUMMARY OF THE INVENTION

The present invention relates to an edible coconut particle coated with a calcium set alginate sol which is suitable for incorporation into a ready-to-spread frosting composition containing water soluble coloring agents. The coated coconut pieces in the frostings exhibit minimal discoloration by colorant migration.

The present coconut pieces comprise a base piece of desiccated coconut. The desiccated coconut piece has a coating of a low viscosity alginate sol of up to about 0.90% by weight. The alginate sol is set with calcium ions which are present up to about 0.2% by weight.

In its method aspect, the invention relates to methods preparing such improved coconut pieces comprising a first step of providing dehydrated coconut flakes. Thereafter, a dilute aqueous solution of a water soluble calcium salt is applied to the coconut pieces in amounts sufficient to provide up to about 0.2% by weight to form calcium laden coconut pieces. Thereafter, the calcium laden coconut is then dehydrated to a moisture content of between about 10% to 15%. Then, an aqueous solution of a low viscosity sodium alginate sol is applied to the pieces in amounts sufficient to provide up to about 0.90% alginate based on the dry weight of the coconut pieces to form an alginate sol encased coconut piece. Thereafter, the pieces are dehydrated to a final moisture content of less than about 14% by weight.

The present invention also pertains to frosting compositions containing such coconut products. The frosting compositions comprise from about 15% to 20% water, from about 5% to 15% fat, from about 0.3% to 1.5% of an edible emulsifier, up to about 15% of edible coconut coated with calcium alginate.

Throughout the specification and claims, percentages and ratios are by weight and temperatures in degrees Fahrenheit, unless otherwise stated.

DETAILED DESCRIPTION OF THE INVENTION

The present invention relates to improved coconut products coated with an alginate sol which are useful for incorporation into conventional ready-to-spread frostings. In its method aspect, the present invention relates to processes for the preparation of such products. The present methods essentially comprise the steps, in sequence, of: (a) providing dried coconut pieces; (b) applying a dilute, calcium ion containing aqueous solution; (c) drying; (d) applying an aqueous solution of alginate; and (e) final drying of the product. Each of these method of preparation steps as well as product steps are described in detail below.

A. Providing Dehydrated Coconut Pieces

Dehydrated coconut pieces are a commodity item readily available in a variety of shapes such as flakes and shreds and the like.

Typically, the moisture content of the useful coconut pieces essentially ranges from about 3% to 15% by weight. Any conventional dehydrating technique can be employed to prepare the dried coconut pieces useful herein. Desiccation is conventionally used to prepare coconut pieces of moisture contents within the lower end of the above-given range. Fresh coconut can also be used but requires dehydration to within the above-given range. The moisture content range is important to ensuring sufficient absorption of the aqueous calcium solution. While the size or shape is not critical to the present invention, coconut shreds and flakes having a size of about 200 mm. are especially suitable for inclusion into ready-to-spread frostings.

B. Applying a Calcium Ion Solution

It is an essential step of the present methods to apply to the dried coconut an aqueous solution of a water soluble salt sufficient to essentially provide at least up to about 0.1%, preferably up to about 0.2% calcium based on the dry weight of the coconut pieces to form calcium-laden coconut pieces. Calcium ions are conventionally used to set alginate solutions. Sodium alginate reacts with any readily available source of calcium ions to form insoluble calcium alginate.

Conventionally, however, the aqueous solution of dissolved calcium ions is added after application of the alginate solutions in various food applications. However, it has been surprisingly discovered that the calcium ions must be added to the coconut prior to the application of the alginate. Reversing the order of the steps can undesirably result in irregularities in the calcium alginate coating on the coconut pieces resulting in imperfect protection against colorant and moisture migration.

Any conventional edible source of solution calcium ions can be used in the present aqueous calcium solution. Preferred for use herein are water soluble calcium salts such as calcium chloride, calcium gluconate, calcium carbonate, calcium sulfate, calcium phosphate, calcium citrate and calcium hydroxide. Since calcium setting of sodium alginate solutions is widely used in the food art, the skilled artisan will have no problems selecting suitable materials for supplying the calcium ion source.

The concentration of calcium ions in the aqueous solution is not critical to the present invention and can vary widely. Rather, it is essential to apply at least 0.1% and up to about 0.3%, preferably at least about 0.2% calcium to the coconut pieces. Insufficient amounts of calcium ions can result in discontinuous coatings being formed. Excessive calcium is not desired since additional amounts provide no benefits.

As noted above, the concentration of the aqueous calcium solution is not critical. Preferably, the calcium salt concentration of preferred dilute solutions ranges from about 1% to 5%. More dilute solutions, of course, can be employed. However, such very dilute solutions require additional, expensive drying to remove the additional water and thus, while useful are not preferred. Even saturated solutions of calcium salts can be used. However, such highly concentrated solutions can result in salt build-up on equipment and possibly in unevenly calcium impregnated coconut pieces and are thus not preferred.

Any conventional technique for evenly applying the aqueous solution of calcium can be employed. Good results are obtained, for example, by spraying or sparging the solution while tumbling the coconut pieces. The tumbling can be continued for a period of time after addition of the solution.

C. Drying

An essential step of the present method is to practice an initial drying step after application of the calcium solution to remove excess water. Of course, the amount of drying will depend upon the amount of water added during the application of the calcium solution. The end point of the initial drying step is controlled by the moisture content of the coconut pieces. After the initial drying step, the moisture content of the coconut pieces desirably ranges from about 14% to 18%, preferably from about 12% to 16%.

Any conventional thermal dehydration technique can be used to practice this drying step including forced hot air drying, vacuum drying, oven drying and the like. Radiant heating such as with infrared or microwaves can also be employed alone or in combination with other dehydration techniques whether simultaneously or sequentially.

Of course, if the initial moisture content of the coconut pieces is quite low, the calcium concentration in the aqueous solution is high, and only the minimal amount of calcium applied to the coconut pieces, then the amount of moisture needed to be removed to provide coconut pieces within the desired moisture content can be quite small, thus reducing the extent of the presently required drying step.

D. Applying an Alginate Solution

Thereafter, an essential step of the present invention is to apply an aqueous solution of a low viscosity sodium alginate sufficient to provide up to about 0.45%, preferably 0.9%, sodium alginate based on the dry weight of coconut pieces to form the calcium alginate encased coconut pieces.

"Low viscosity" is used herein in its conventional sense in the alginate art to refer to those sodium alginate compositions exhibiting a viscosity in aqueous solution of less than about 50 cp at 25° C. at 1% concentration. (Brookfield LVF Viscometer @ 60 RPM). Such materials are commercially available, e.g., Kelco's (Division of Merck & Co., Inc.) KELGIN LV or KELGIN RL brands of sodium alginate. The skilled artisan will have no problem selecting suitable alginate materials for use herein.

Low viscosity sodium alginate is useful since relatively concentrated aqueous solutions, e.g., up to about 3%, can be prepared which have viscosities low enough for the material to be readily applied to the coconut pieces and evenly dispersed thereupon. High concentrations of alginate, e.g., apx. 3% are desirable so as to reduce the final drying step.

However, the concentration of the sodium alginate is not critical, and can usefully be employed as low as about 0.5%.

In the present invention, it is essential to apply to the coconut pieces at least about 0.45% of sodium alginate and preferably up to about 1.00%. For best results, the alginate is applied to about 0.90%. Insufficient sodium alginate addition can also result in coatings which are discontinuous. Excessive alginate application can result in excessively tacky products with minimal increases in protection against colorant or water migration. Besides the potential clumping problem in frostings having excessively tacky alginate coatings, the coconut products' organoleptic properties can be adversely affected as well.

The same application techniques used to practice the aqueous calcium ion solution can be employed in practicing the step of applying the sodium alginate solution. Thus, for example, the alginate solution can be sprayed onto the coconut pieces while simultaneously tumbling the pieces.

As the solution of sodium alginate is applied to the calcium-laden coconut pieces, a coating is formed on the surface of the coconut pieces as a result setting reaction between the calcium and the alginate. As more and more of the alginate solution is applied, a thicker barrier coating of water insoluble calcium set alginate is built up.

E. Final Drying

A finish or final drying step is an essential element of the present methods of preparation. Desirably, coconut pieces are dehydrated to a final moisture content of between about 10% to 15%. For best results, the final moisture content of the coconut pieces is about 14%.

The same or different thermal dehydration techniques can be employed in practicing the final drying step as in the initial drying step. The preferred dehydration technique herein is forced hot air drying.

The products so produced are coconut pieces coated with up to about 0.90% (dry basis) of the coconut pieces of a low viscosity calcium alginate.

Optionally, up to about 1.5% of propylene glycol can be added as an anti-mold ingredient prior to the finish drying step. Of course, minor amounts of such adjuvants such as color, vitamins, and flavors can be added to either the calcium or alginate solutions.

COMPOSITION USE

The products of the present invention are useful in a variety of food products having $A_w$ lower than that of dried coconut pieces and/or wherein water soluble colorants are employed. Thus, the present coconut products are particularly useful for addition into ready-to-spread frostings. Such compositions are well known. (See, for example, U.S. Pat. No. 3,464,830 issued Sept. 2, 1969 to Wahba and U.S. Pat. No. 3,767,830 issued Oct. 23, 1973 to Reimer) which are incorporated herein by reference. Generally, such compositions comprise from 15% to 20% water, from about 5% to 15% fat, from about 40% to 60% sugar, and from about 0.3% to 1.5% of an emulsifier. The present invention also relates to an improved ready-to-spread frosting which additionally comprises up to about 15% of the present coated coconut products.

The present coconut products can be simply admixed with previously prepared frosting compositions employing conventional apparatus and techniques.

The coated coconut pieces of the present invention have additional usefulness when added to a variety of other intermediate moisture foods such as yogurt, condensed milk, pina colada mix, honey, liquid beverage concentrates, etc.

The coconut products, their methods of preparation and frosting compositions containing the present coconut products are illustrated by the following examples.

EXAMPLE I

A coated coconut piece of the present invention can be coated with a calcium alginate coating prepared in the following manner.

The coated coconut will have the following composition:

| | |
|---|---|
| Desiccated Flake Coconut (moisture content 3.5%) | 89.386% |
| Water | 10.000 |
| Sodium alginate | 0.450 |
| Calcium chloride (anhydrous) | 0.164 |
| | 100.000% |

Thus, the total moisture content of the coated coconut pieces is about 13.5%.

For a 2000 g. batch, solutions of calcium chloride and sodium alginate are prepared:

| Amount | Ingredient | Weight % |
|---|---|---|
| 294 g. | Water | 98.00% |
| 6 | Calcium Chloride | 2.00 |
| 300 g. | (Anhydrous) | 100.00% |
| 291 g. | Water | 97.00% |
| 9 | Sodium Alginate | 3.00 |
| 300 g. | (Kelgin RL)* | 100.00% |

*A low molecular weight alginate gum sold by Kelco Division of Merck Co., Inc.

The calcium chloride solution is prepared by adding the calcium chloride to the water and stirring until dissolved. The alginate solution is prepared by slowly adding the dry alginate to the vortex formed by water in a slow speed blender. The mixture is allowed to blend for 5–10 minutes for complete hydration of the alginate.

The coating is applied during a two-step operation. Two thousand grams of desiccated flake coconut at 75°–80° F. is placed into a coating pan or enrober and rotated at a rate sufficient enough to provide coconut tumbling. The coconut should be free of all lumps.

With coconut tumbling, the calcium chloride solution is added by pouring very slowly onto the coconut. When all 300 g. of solution have been added, continue tumbling and provide a source of hot air such as a blow dryer, to drive off excess moisture. Continue drying the coconut until it no longer sticks together when squeezed by hand. The moisture content is determined by gravimetric analysis to be apx. 15%. The added calcium is then present at about 0.164% by weight of the coconut pieces (dry weight).

The alginate solution is then added by means of a sprayer and nozzle to provide a fine mist onto the tumbling coconut. Approximately 0.45% alginate by weight is applied to the coconut pieces on a dry weight basis. When all of the solution has been sprayed on, a hot air source is provided for drying, and continue drying until coconut no longer clumps together when squeezed by hand. The pieces are determined by gravimetric analysis to have a moisture content of about 14.5%.

The coated coconut of the present invention so prepared is used to prepare a ready-to-spread frosting having the following composition and in the manner described:

| | | |
|---|---|---|
| Orange frosting base* | 84.5% | 1690 g. |
| Coated coconut pieces | 10.5 | 210 |
| Chopped nuts | 5.0 | 100 |
| | 100.0% | 2000 g. |

*A retail, ready-to-spread frosting sold by General Mills, Inc.

The frosting base is put into a vertical mixer with paddle. The nuts and the coconut are added and mixed at a slow speed until uniform distribution is attained.

The product so prepared can be used as if in conventional manner or can be packaged and sold in conventional ready-to-spread frosting containers. The containers when opened exhibit white coconut pieces indicating minimal migration of water and/or water soluble colors into the coated coconut pieces of the present invention.

Compositions of substantially similar protection against moisture migration are realized in the above method of preparation when the calcium chloride is substituted with an equivalent amount of calcium carbonate or calcium citrate.

Additionally, the coated coconut pieces can be added to a conventional creamy-style yogurt, packaged and distributed.

EXAMPLE II

Coated coconut pieces of the present invention coated with calcium alginate are prepared in the following manner.

For a 14 lb. batch, solutions of calcium chloride and sodium alginate are prepared:

| Amount | Ingredient | Weight % |
| --- | --- | --- |
| 934.0 g. | Water | 98.00% |
| 19.1 | Calcium chloride | 2.00 |
| 953.1 g. | (anhydrous) | 100.00% |
| 1850.0 g. | Water | 97.00% |
| 57.2 | Sodium Alginate | 3.00 |
| 1907.2 g. | (Kelgin XL) | 100.00% |

*A low viscosity alginate gum sold by Kelco Division of Merck & Co., Inc.

The calcium chloride solution is prepared as in Example I, by adding the calcium chloride to the water and stirring until dissolved. The alginate solution is prepared using a low speed blender as in Example I.

The coating is applied during a two-step operation. Twelve and one half pounds of desiccated flaked coconut (moisture content is apx. 3.5%) at 75°–80° F. is placed into a large coating pan or enrober and rotated at a rate sufficient enough to provide coconut tumbling. The coconut is free of all lumps.

In this example, the calcium chloride solution is sprayed onto the coconut while it is tumbling. A source of hot air such as a blow dryer, is provided to drive off excess moisture. Drying is continued until coconut no longer sticks together when compressed by hand and is determined to have a moisture content of 14.5%. The calcium ion added is about 0.18% based on the dry weight of the coconut.

The alginate solution is sprayed onto the tumbling coconut by means of a sprayer and nozzle to provide a fine mist onto the coconut. When approximately one half of the alginate has been applied, the hot air drying is begun while remaining alginate solution is continuously applied. After all of alginate solution has been applied, the drying is continued until the coconut no longer clumps together when squeezed by hand. The coconut is determined to have a moisture content of 14.7%. The alginate applied constitutes about 0.9% of the dry weight of the coconut pieces.

The product so prepared can be used in conventional ready-to-spread frosting and exhibits minimal moisture or color migration from the frosting to the coconut pieces.

What is claimed is:

1. A method of producing coconut pieces stabilized against moisture migration, comprising the steps, in sequence, of:
   (a) providing dehydrated coconut pieces;
   (b) applying a dilute aqueous solution of a water soluble calcium salt sufficient to provide up to about 0.1% weight calcium based on the dry weight of the coconut pieces to form calcium-laden coconut pieces;
   (c) drying the pieces to a moisture content of 12% to a moisture content of about 16% by weight;
   (d) applying an aqueous solution of up to about 3% by weight low viscosity sodium alginate in amounts sufficient to provide up to about 0.45% alginate based on the dry weight of coconut pieces to form alginate encased coconut pieces; and
   (e) drying the pieces to a final moisture content of from about 10% to about 15% by weight.

2. The method of claim 1 wherein
   the dehydrated coconut pieces in step (a) range in moisture from about 3% to 15% by weight;
   the solution of water soluble calcium salt is applied sufficient to provide up to about 0.2% by weight calcium;
   the solution of sodium alginate is applied sufficient to provide up to about 0.9% alginate by weight; and
   the final moisture content ranges from about 10% to 15% by weight.

3. The method of claim 2 wherein the water soluble calcium salt is calcium chloride.

4. The method of claim 3 wherein the solution of sodium alginate is applied sufficient to provide up to about 0.45% alginate by weight.

5. An unsweetened coconut product, comprising:
   an edible coconut base particle; and
   a water impermeable coating over the particle, said coating comprising up to about 0.90% by weight of the product of a low viscosity sodium alginate.

6. A ready-to-spread frosting composition comprising
   (a) from about 5% to 15% by weight of an edible fat;
   (b) from about 15% to 20% of water;
   (c) from about 0.3% to 1.5% of an edible emulsifier;
   (d) from about 40% to 60% sugar; and
   (e) about 1% to 15% by weight of coconut pieces coated with up to about 0.90 low viscosity calcium alginate based on the dry weight of the coconut pieces.

* * * * *

UNITED STATES PATENT AND TRADEMARK OFFICE
CERTIFICATE OF CORRECTION

PATENT NO. : 4,386,108
DATED : May 31, 1983
INVENTOR(S) : Gary W. Richter

It is certified that error appears in the above-identified patent and that said Letters Patent are hereby corrected as shown below:

Column 3, line 23 - "solution" should be -- soluble --.

Signed and Sealed this

Thirteenth Day of December 1983

[SEAL]

Attest:

GERALD J. MOSSINGHOFF

Attesting Officer     Commissioner of Patents and Trademarks